United States Patent [19]
Cadiou

[11] 3,794,847
[45] Feb. 26, 1974

[54] WINDSHIELD WIPER CONTROL MEANS

[75] Inventor: Jean Georges Cadiou, St. Cloud, France

[73] Assignee: Societe Anonyme Automobiles Citroen, Paris, France

[22] Filed: June 2, 1972

[21] Appl. No.: 259,198

[30] Foreign Application Priority Data
June 11, 1971  France.....................71.21251

[52] U.S. Cl........ 307/117, 200/61.05, 200/DIG. 14, 317/DIG. 3
[51] Int. Cl. ......................................... H01h 35/00
[58] Field of Search... 200/61.05, DIG. 14, DIG. 40; 307/117; 340/52, 59, 235; 317/DIG. 3; 328/4

[56] References Cited
UNITED STATES PATENTS
| | | | |
|---|---|---|---|
| 2,617,972 | 11/1952 | Nutter | 200/DIG. 14 |
| 3,500,844 | 3/1970 | Sanner | 200/61.05 X |
| 3,307,095 | 2/1967 | Redmond | 200/61.05 X |

Primary Examiner—Robert K. Schaefer
Assistant Examiner—William J. Smith
Attorney, Agent, or Firm—Brisebois & Kruger

[57] ABSTRACT

Windshield wiper control comprises a moisture detector in the form of two electrodes separated by a labyrinthine gap and positioned to be wiped by a windshield wiper blade. The motor controlling the wiper is started and stopped by a relay actuated by a control circuit containing the gap between the electrodes so as to start the wiper when the gap is bridged by moisture and stop it when the moisture evaporates. Means are provided for changing the threshold of response after the wiper has been started so that the wiper will stop when there is more moisture on the detector than is required to start it.

11 Claims, 8 Drawing Figures

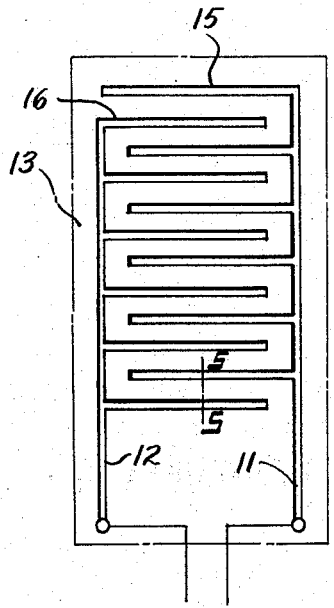
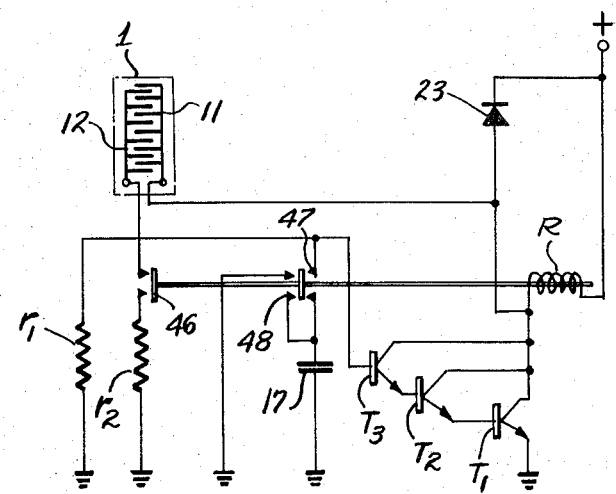
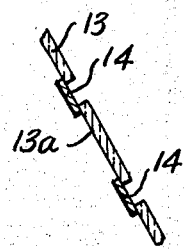
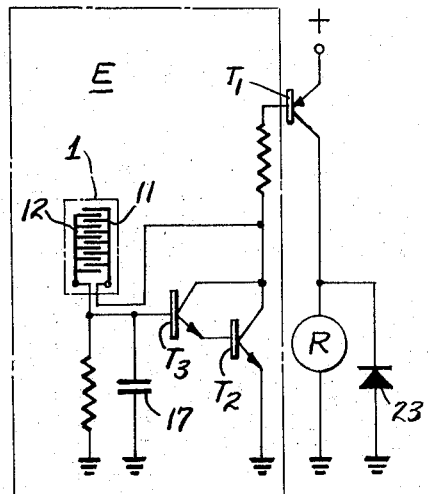
fig.4.
fig.6.
fig.5.
fig.7.

WINDSHIELD WIPER CONTROL MEANS

SUMMARY OF THE INVENTION

This invention relates to an automobile control for a windshield wiper of the type comprising at least one wiping blade actuated by a motor, and is particularly applicable to automotive vehicles.

Devices which start an electric motor for actuating a windshield wiper when drops of rain appear are already known.

A device of this type may comprise a detector inserted in the control circuit of a relay through which the electric motor of the windshield wiper is supplied. This detector consists of two electrodes separated by an electrical gap. The electrical gap between these electrodes, which are positioned on the outside of the vehicle, generally on a portion of the surface to be wiped, is partially short-circuited by the drops of rain. A current then flows in the control circuit to actuate, by electronic means for example, the relay through which the motor is supplied.

The motor is stopped when the drops of rain cease to fall and have evaporated in response to ambient atmospheric conditions and the action of the windshield wiper.

In automatic windshield wiper controls of this type the conductivity of the conductor has not heretofore been a direct function of the state of the surface being wiped, and they have therefore suffered from the disadvantage that they are not automatically started or stopped at the most judicious moment.

A first object of the present invention is to provide an automatic control for a windshield wiper comprising a detector, the resistance of which is variable in response to the moisture to which it is subjected, or to the moisture to which the windshield to be wiped is subjected, both because of its geometric configuration and because of the effect of the windshield wiper on it.

Another object of the invention is to obtain two different threshold values for the resistance provided by the detector, one for starting it, and the other for stopping the windshield wiper, with the latter value less than the former.

An automatic windshield wiper control according to the invention thus comprises a detector having a resistance which varies in dependence upon the amount of moisture to which it is subjected, said detector being inserted in the electrical control circuit of a relay by means of which the windshield wiper is stopped and started, with the moistness of said conductor being a function of the moistness of the surface to be wiped, and is characterized by the fact that the detector comprises two thin, narrow electrodes, each of which extends over a substantially equal distance, which distance is substantially greater than the average distance which separates the electrodes on the surface of an insulated body exposed to atmospheric conditions and wiped by auxiliary wiping means, the operation of which is dependent upon the wiper to be controlled.

Preferably the electrodes comprise a plurality of elongated members, and they may advantageously take the form of combs having interfitting teeth.

Moreover, the auxiliary wiping means may consist of at least one windshield wiper blade, with the surface constituting the gap between the electrodes being a part of the surface to be wiped.

This arrangement provides an automatic windshield wiper control having a detector which is instantaneously subjected to the same average moisture conditions as the surface to be wiped.

In a preferred embodiment of the invention the detector is inserted in a voltage divider biassing the base of a transistor which breaks the relay control circuit of the motor of the windshield wiper when the resistance of said detector is greater than a first given threshold value.

It is, finally, advantageous to provide means for controlling the relay which varies at least one of the resistances of the voltage divider in dependence on the position of this relay in such a manner that, when the windshield wiper has been started, the circuit breaking threshold of the transistor will be attained for a second threshold value of the resistance of the detector which is less than the first value, said means bringing the voltage divider into its initial state when the windshield wiper is stopped.

Such a device, when applied to the windshield wiper of a vehicle, frees the driver from any responsibilities relative to the control of the wiper while permitting an optimum quality of wiping, which represents an important safety factor.

The invention will be better understood and certain supplementary characteristics will become apparent from a reading of the following description of several embodiments of the invention, which are illustrated in the accompanying drawings, in which:

FIG. 4 is a plan view showing one embodiment of the electrodes constituting the detector;

FIG. 5 is a partial sectional view on a larger scale taken along the line X–Y of FIG. 4;

FIGS. 6 and 7 are two representative circuit diagrams showing circuits which may be used for the detector for automatically controlling the motor driving the wiper blades.

Like reference numerals indicate like parts throughout the several views.

Figure 1:
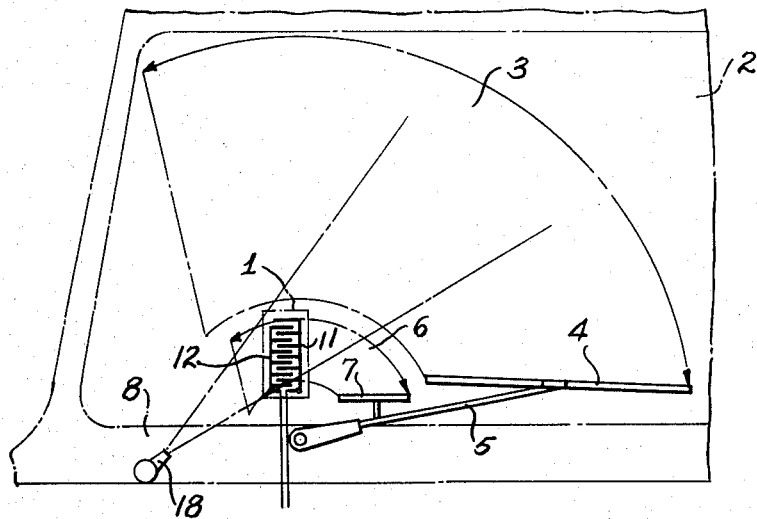
FIGS. 1 to 3 are front elevational views of a part of the windshield (shown in broken lines) of an automotive vehicle equipped with an automatic windshield wiper control according to three different embodiments of the invention.

The invention comprises, as shown in FIG. 1, a resistive detector 1 which is flat and very thin, of the printed circuit type, positioned on the external surface of the windshield 2 of an automotive vehicle. A zone 3 of this windshield may be wiped by a blade 4 driven by an arm 5 which is part of the conventional linkage which converts the continuous rotary movement of an electric motor into alternating motion.

The detector 1 is positioned on a part 6 of the windshield outside the zone 3 and is subjected to the same wiping action by means of an auxiliary blade 7 directly coupled, without articulation, to the arm 5 of the blade 4.

According to another embodiment (FIG. 2) the detector is positioned near the windshield on its frame 3, and the auxiliary wiper is connected to the driving means, for example, by a rod 9 driven by the arm 5 which imparts thereto an oscillating motion about an axis 10.

Figure 2:
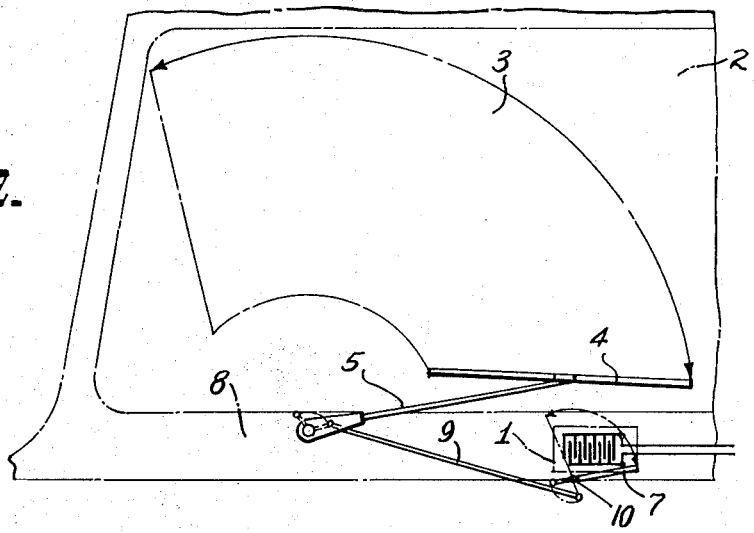
Figure 3:
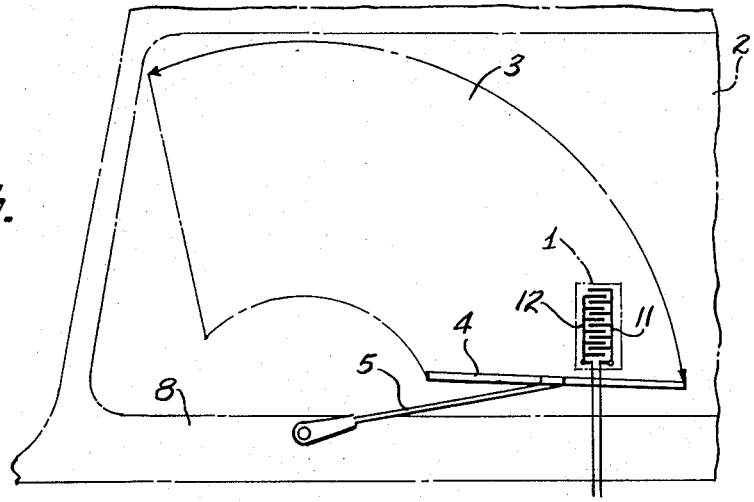

As shown in FIG. 4, the detector comprises two conductive electrodes 11 and 12 embedded in an insulator 13 (which is the windshield in the cases of FIGS. 1 and 3). These electrodes each have a surface 14 which is not insulated from the atmosphere. The portion 13a of the surface of the insulating body 13 forms an electric gap between the two electrodes in the absence of drops of water. In the case of FIG. 2, the insulating body is a thin plate adhesively secured to the windshield frame 8.

The electrodes 11 and 12 are thin and consist of a plurality of narrow members the total length of which is clearly greater than the average distance therebetween.

Preferably the electrodes 11 and 12 are in the shape of conductive toothed combs having teeth 15 and 16 insulated from each other and interfitting with the teeth on the other comb (see FIGS. 1 – 4). The space between successive teeth is such that it may be covered by an average drop of water and the electrodes are then connected to form a closed circuit which causes the motor for driving the wiping members to be supplied. The different geometric parameters of the detector (length, width, spacing between the teeth) are determined as a function of the desired sensitivity, and the orientation of the combs may vary between a position in which the teeth are horizontal and a position in which they are vertical, depending upon the aerodynamic conditions prevailing at the level of the detector.

The electrodes are flush with the surface being wiped, or are depressed very slightly beneath that surface in order to avoid deterioration of the wiper blade.

A simplification may advantageously be attained by the arrangement illustrated in FIG. 3 in which the detector 1 is directly wiped by one or more of the blades 4 which wipes the windshield. In effect, the detector 1 utilizes conductive combs of the printed circuit type which are especially flat and thin to insure that the grille forming the detector is sufficiently transparent to permit its interposition in the visual field being wiped.

The electronic circuits used to transmit the signals from the detector to the automatic control means are simple and of the threshold type, utilizing relay means to control the supply circuit for the driving motor. Two examples are shown on FIGS. 6 and 7 in which the relay is controlled by a transistor.

In this case, the detector 1 previously described is inserted in a voltage divider biassing the base of a preamplifier transistor T3 which drives an amplifier transistor T2, the number of transistors being a function of the resistance of the coil of the relay R controlling the supply to the driving motor. The transistor T1 of the PNP type (FIG. 7), or NPN type (FIG. 6), controls the relay R to break the control circuit when the resistance of the detector 1 is greater than a given value. These components are grouped inside a receptacle E mounted at a predetermined point.

When the detector is dry the resistance between the electrodes is practically infinite, so that there is no current through the chain of transistors T3, T2, T1, the base of T3 being then unbiassed. Drops of rain cause a partial short-circuit between the combs 15 and 16 of the detector 1 so that a current appears in the voltage divider, thus biassing the base of T3, and rendering T1 conductive so as to excite the relay R closing the supply circuit connected to the driving motor. A condenser 17 (FIG. 7) connected to the base of T3 avoids any parasitic starting due to instability of the voltage resulting from the state of the detector by damping any oscillations in potential for the values near those causing the closing of the circuit. Moreover, one of the electrodes of the detector 1 is not directly connected to the positive terminal so as to protect the transistors against possible accidental short-circuits and its connection to the collector of T2 favors interruption of the circuit. In all cases it is possible to provide an electronic assembly responsive either to a negative voltage (FIG. 6) or a positive voltage (FIG. 7), the transistor T1 being of the NPN or PNP type respectively.

When the rain stops, the surface being wiped becomes progressively drier and the insulation previously existing between the combs is re-established until the resistance of the circuit attains the initial circuit-breaking threshold, the electronic circuit no longer energizes the coil of the relay, the supply circuit for the driving motor is interrupted, and the wiping blades cease to operate.

When the device is started by a drop of water falling on the detector, the wiping means spreads this drop into a very thin film and because of the short-circuiting effect of this film, the resistance of the detector falls to a value clearly lower than the threshold value required for starting. This value tends to increase between two successive passes of the wiper blade but it decreases again during each pass, so that the stopping of the device may take too long, especially in the case of very light rain when only an intermittent wiping at low frequency is desired. FIG. 6 shows an arrangement making it possible to obtain two different threshold values, one for starting, and the other for stopping the wiper. This arrangement may of course be readily adapted to the device of FIG. 7.

In FIG. 6 the base of T3 is connected between the electrode 12 of the detector and a resistance $r1$ connected to ground, the electrode 11 being connected to a positive voltage source through the coil of the relay R.

A resistance $r2$ is connected in parallel with the resistance $r1$ by the closing of a contact 46 controlled by the relay R. The contact 46 is closed when the relay R supplies the motor of the windshield wiper.

A condenser 17 is connected between the base of T3 and ground by a contact 47 controlled by the relay. The contact 47 is closed when the relay R is not energized, and opening of the contact 47 closes a contact 48 short-circuiting the plates of the condenser 17.

The operation is as follows:

When a drop of water reduces the resistance between the electrodes 11 and 12 of the detector beneath a certain threshold value determined by the choice of $r1$, a current appears in the voltage divider, biasses the base of T3, rendering T1 conductive, which excites the relay R to complete the supply circuit for the driving motor, closes the contact 46, and opens the contact 47.

The equivalent resistance of the assembly $r1$ and $r2$ being less than the resistance $r1$, the voltage divider is caused to render T3 non-conductive for a value of the resistance of the detector less than the threshold starting value. The starting and stopping thresholds may thus be independently selected so as to have a great sensitivity for starting while permitting rapid stopping if one drop of water is not quickly followed by another.

Charging of the condenser 17 delays the increase in the potential of the base of $T_3$ when the relay opens so as to avoid a return to the initial sensitivity at the time of stopping until the humid film has had time to evaporate. The stability of the control is thus assured.

The cycle thus provided has the advantage of ensuring an intermittent operation which may be varied in dependence on the density of the rain or the frequency of the splashes coming from other vehicles.

It is possible to position the detector so that it is in the zone reached by the jets of a windshield washer 18 (FIG. 1). Wiping then automatically starts whenever the windshield washer starts, which has the effect of cleaning the combs 15 and 16. More rapid starting may be obtained by coupling the control for the windshield washer with the direct manual control for the motor driving the wiper. In this case wiping and the emission of water are simultaneous, with the wiping then following the cycle described and being automatically interrupted upon drying of the surface at the level of the detector.

The device according to the invention also permits improved operation in particular cases which are especially difficult to handle, such as those resulting from snow or frosting of the windshield when the device is stopped.

As it is not desirable to start windshield wipers on a windshield covered with snow or ice it is necessary to prevent the automatic starting under such conditions, and this is made possible by the conception and arrangement of the detector. In effect a layer of snow or ice cannot start the device because the resistance then existing between the combs of the detector is at a level very slightly greater than that produced by the presence of water on this same detector and this resistance does not descend to the level at which the electronic circuit is activated. On the contrary, once hot air from the de-icer operating on the surface to be wiped (or the application of any anti-icing product) has melted the snow or frost, normal conditions are re-established so that the automatic cycle hereinbefore described can be started, the detector having been judiciously positioned in a zone which is in the same state, so far as moisture is concerned, as the surface to be wiped. During falling snow the operation is maintained by the thermal defrosting action at the level of the windshield.

Figure 8:
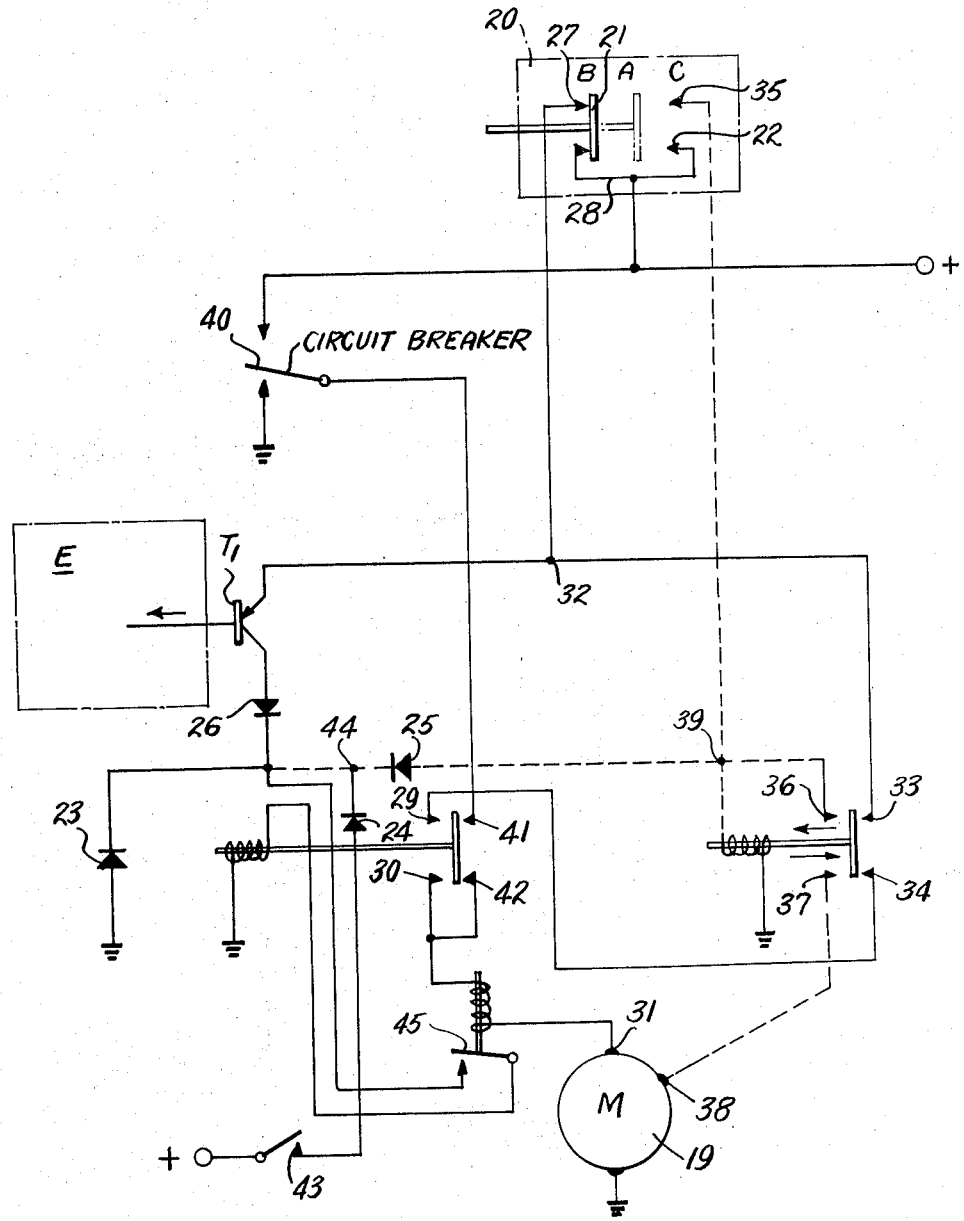
FIG. 8 is the diagram of a circuit for automatically controlling a two-speed motor through a three-positioned commutator.

The electronic controls shown on FIGS. 6 and 7 may be used on a windshield wiper circuit conforming, for example, to the one illustrated in FIG. 8 controlling a two-speed ferrite motor 19 through a 3-position switch 20 so as to provide the following possibilities:

Position A - parking,
Position B - automatic control,
Position C - manual control of rapid speed.

Such an arrangement comprises two supply circuits, each corresponding to different speeds (circuit in solid lines for normal speed, circuit in broken lines for rapid speed). Each circuit individually controlled by the contacts 21 or 22 actuates the relay R or R1 to insure the operation of the motor 19 under the conditions previously mentioned, and comprises a series of diodes 23, 24, 25, 26 controlling the direction and distribution of the current in the conductors. In position B, "normal speed", the contact arm 21 connecting the terminals 27 and 28 of the switch 20 supplies the relay R through the transistor $T_1$ and completes the circuit between the contacts 29 and 30. The motor 19 is thus supplied at the terminal 31 through the other branch of the circuit beginning at the common upstream point 32 and passing through the contacts 33 and 34 which are closed by the relay R when its coil is not energized. The electronic assembly of the automatic control remains in circuit.

In position C, "rapid speed", the terminals 28 and 35 are connected by the contact arm 22, the positive power source energizes the coil of the relay $R_1$ and attracts its armature to bridge the contacts 36, 37, thus completing the circuit supplying the terminal 38 of the motor 19. The current may then pass along the path 35, 39, 36, 37, 38 and the wiper blade is actuated. However, in order to avoid a short circuit of the motor at the level of the terminal 13 during starting, which short circuit might be caused by grounding through the automatic circuit breaker 40, the relay R is conjointly supplied by a branch of the network connected to the point 39, the current in which energizes the coil of said relay so that its armature is brought up against the contacts 29, 30, interrupting the return circuit to ground. On the other hand, in this rapid speed position, the automatic electronic control assembly is voluntarily put out of service ($T_1$ is not supplied by the "normal speed" circuit which remains open). In this case, the presence of the diodes 23, 24, 25, 26 makes it possible to direct current flow towards the relay R while blocking it in the opposite direction, and the interruption of the return circuit to ground resulting from opening of the contact between 41, 42, prevents the emission at each cycle of a voltage pulse from the positive source to the terminal 31 of the motor.

In position A of the switch 20 the automatic control is no longer operative and the circuits are no longer supplied so that the wiper cannot operate. This possibility is useful in certain cases, e.g., when a portion of a windshield is being washed with the vehicle motor on.

The manual control of rapid operation during which the electronic circuit is not supplied, makes it possible to start or stop the wiper at will as a function of various factors. FIG. 8 also comprises a circuit 43 for controlling the windshield washer coupled to the main circuit at point 44 and including, if necessary, a positive supplementary power source. A pulse through this control circuit energizes the relay R and leads to the following:

In position B, with terminals 27 and 28 connected for normal speed, the wiper is put in service for a length of time corresponding to the drying cycle of the detector 1 controlling the automatic electronic control circuit connected in this position. In position A, the result is operation for a single wiping period in response to a pulse, or a tributary action dependent on the duration of the intervention of the control switch 43, the circuit subjected to voltage being in effect insulated from the automatic control complex by the diode 26 and closing only on operation of the automatic circuit breaker 40 connected to ground. During rapid speed operation the energization of the relay 1, which causes the motor to be supplied through the contacts 36, 37, opens the normal speed circuit between the points 33, 34 and prevents uncontrolled parasitic emissions from the terminal 31 of the motor M from reaching the transistor T1.

In certain cases, for example, if the surface of the glass being cleaned is found to dry more rapidly than that of the detector, it may be advantageous to so connect the device that it will react under the control of another stopping parameter such as the torque of the windshield wiper motor. Thus by inserting in the supply line for the first rate of speed a flexible blade switch 45 sensitive to the magnetic field of a solenoid supplied by the magnitude of the current drawn, it becomes possible to make the stopping of the mechanism dependent on the torque required for operation. For a suitably selected value of torque the operation of the switch 45 stops the supply of the relay R and stops the wiping of the drying window.

As thus described, the device is adapted to respond to the exigencies of operation under the most severe conditions. The various possibilities offered permit the following functions to be carried out:

In position A of the switch, a tributary wiping for the duration of the operation of the manually actuated windshield washer;

In position B of the switch, a "normal speed" operation the starting and stopping of which is entirely automatic and dependent on the state of the surface of the zone being wiped (speed of wiping, and average continuous rain). Control through the windshield washer remains possible in the same way;

In position C of the switch, wiping at "rapid speed", under manual control, as a matter of choice, depending on the circumstances (heavy rain, high vehicle speed) the operation being entirely independent of the automatic control.

Of course, the scope of the invention is not limited to the specific embodiments hereinbefore described, since these may be modified as to details without thereby departing from the basic principles of the invention.

What is claimed is:

1. In automatic means for controlling the operation of a windshield wiper for an automotive vehicle, which means comprises a moisture detector the resistance of which is dependent on the amount of moisture to which it is subjected, said detector being inserted in the electrical control circuit of a relay for starting and stopping the wiper, and being so located that the moistness of said detector is representative of the moistness of the windshield to be wiped, the improvement according to which said detector comprises two thin narrow electrodes spaced apart on the surface of an insulating member, said electrodes being of substantially equal length, which length is greater than the average distance by which they are separated, and the surface of said insulating member is exposed to atmospheric conditions and wiped by auxiliary wiping means coupled to the windshield wiper to be controlled.

2. Automatic control means as claimed in claim 1 in which each electrode comprises a plurality of elongated components in the form of combs having interfitting teeth.

3. Automatic control means as claimed in claim 1 in which the detector is inserted in a voltage divider which biasses the base of a transistor controlling the supply circuit of a relay which controls a motor driving said windshield wiper and is connected to open said supply circuit to prevent operation of said wiper, when the resistance of said detector is greater than a first given threshold value.

4. Automatic control means as claimed in claim 2 in which said auxiliary wiping means consists of at least one windshield wiper blade and wipes part of said windshield.

5. Automatic control means as claimed in claim 3 in which an auxiliary circuit coupled to the control means for a windshield washer is connected between the coil of said relay and said transistor.

6. Automatic control means as claimed in claim 3 in which threshold changing means controlled by the relay are connected to vary, in dependence on the position of said relay, the resistance in at least one section of the voltage divider in a manner such that, when the windshield wiper has been started, the transistor prevents closing of the relay at a value of the resistance of the detector which is lower than said first value, but returns the resistance of the voltage divider to its initial value when the windshield wiper is stopped.

7. Automatic control means as claimed in claim 3 comprising a switch inserted between the coil of the relay and said transistor, which switch is subjected to the action of the current drawn by the motor and adapted to operate in response to a certain value thereof.

8. Automatic control means as claimed in claim 3 in which the motor driving the windshield wiper is of the two-speed ferrite type, connected to operate at normal speed upon actuation of a first relay controlled by the automatic device, and connected to operate at a more rapid speed upon actuation of a second manually operated relay, the supply circuit for normal speed operation being connected to be completed only if the second relay has opened the supply circuit for rapid speed operation.

9. In an automatic device for controlling the operation of windshield wiping means for an automotive vehicle, which device comprises a moisture detector including two spaced electrodes separated by an electric gap and positioned on a surface of the windshield subjected to the action of a windshield wiper blade, which detector has a variable electrical resistance dependent upon the moistness of the surface of the windshield to be wiped and is inserted in the control circuit of an electrical relay connected to make and break the supply circuit to a motor for driving said windshield wiping means, said relay being connected to be closed and to thereby complete said supply circuit, whenever the resistance of said variable electric resistance falls below an original threshold value, the improvement according to which the two electrodes of the detector are thin and narrow and spaced from each other by a labyrinthine insulating gap, and said device comprises control means actuated upon closing of said relay to temporarily increase said threshold value and upon subsequent opening of said relay to return said threshold value to its original value.

10. A device as claimed in claim 9 in which said windshield wiping means comprises a main wiper blade and an auxiliary wiper blade, and said moisture detector is subjected only to the action of said auxiliary wiper blade.

11. A device as claimed in claim 9 in which the control means actuated by said relay comprises time delay means for delaying the return of said threshold value to its original value for a predetermined interval after said relay opens.

* * * * *

UNITED STATES PATENT OFFICE
CERTIFICATE OF CORRECTION

Patent No. 3,794,847　　　　Dated February 26, 1974

Inventor(s) JEAN GEORGES CADIOU

It is certified that error appears in the above-identified patent and that said Letters Patent are hereby corrected as shown below:

Column 2, line 64, "3" should read --8--.

Column 8, line 51, cancel "increase" and substitute --decrease--.

Rule 323

Substitute new Figure 5 for old Figure 5.

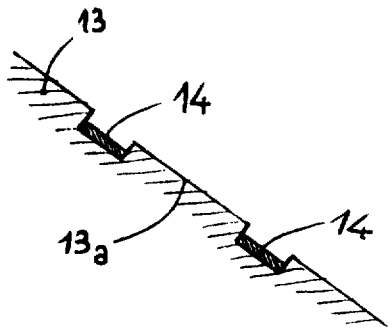

Signed and sealed this 10th day of September 1974.

(SEAL)
Attest:

McCOY M. GIBSON, JR.
Attesting Officer

C. MARSHALL DANN
Commissioner of Patents